United States Patent
Xie et al.

(10) Patent No.: US 10,952,832 B2
(45) Date of Patent: Mar. 23, 2021

(54) ELECTRIC TOOTHBRUSH MOTOR

(71) Applicant: Zhongke (Shenzhen) Innovation and Creative Technology Co., Ltd., Shenzhen (CN)

(72) Inventors: Yuanpeng Xie, Shenzhen (CN); Zhengjun Cheng, Shenzhen (CN); Huiru Zhang, Shenzhen (CN); Fengcai Xie, Shenzhen (CN); Junyun Xiao, Shenzhen (CN)

(73) Assignee: Zhongke (Shenzhen) Innovation and Creative Technology Co., Ltd., Shenzhen (CN)

( * ) Notice: Subject to any disclaimer, the term of this patent is extended or adjusted under 35 U.S.C. 154(b) by 29 days.

(21) Appl. No.: 16/393,633

(22) Filed: Apr. 24, 2019

(65) Prior Publication Data

US 2020/0237492 A1 Jul. 30, 2020

(30) Foreign Application Priority Data

Jan. 28, 2019 (CN) .......................... 201910079451.1

(51) Int. Cl.
| | |
|---|---|
| *H02K 33/02* | (2006.01) |
| *A61C 17/02* | (2006.01) |
| *A61C 17/34* | (2006.01) |
| *A61C 17/22* | (2006.01) |
| *H02K 33/18* | (2006.01) |

(52) U.S. Cl.
CPC ............ *A61C 17/34* (2013.01); *H02K 33/02* (2013.01); *A61C 17/221* (2013.01); *H02K 33/18* (2013.01)

(58) Field of Classification Search
CPC ...... A61C 17/34; A61C 17/221; H02K 33/02; H02K 33/18
USPC ...................................................... 310/36, 50
See application file for complete search history.

(56) References Cited

U.S. PATENT DOCUMENTS

| | | | | |
|---|---|---|---|---|
| 3,135,881 | A * | 6/1964 | Fresard ................. | H02K 7/145 310/36 |
| 6,833,639 | B2 * | 12/2004 | Lau ........................ | H02K 33/16 310/36 |
| 7,732,952 | B1 * | 6/2010 | Taylor .................... | A61C 17/20 310/36 |
| 2006/0255665 | A1 * | 11/2006 | Kraus .................... | H02K 33/18 310/36 |
| 2008/0209650 | A1 * | 9/2008 | Brewer ................ | A61C 17/221 15/22.1 |

(Continued)

*Primary Examiner* — John K Kim
(74) *Attorney, Agent, or Firm* — Bay State IP, LLC (57) ABSTRACT

The present disclosure relates to the technical field of electric toothbrushes, and in particular to an electric toothbrush motor. The electric toothbrush motor comprises a mounting shell, an end cover, conductors, a rotor assembly and a stator assembly, wherein the rotor assembly and the stator assembly are fixedly arranged in an accommodating cavity of the mounting shell through the end cover. The first magnetic steel sheets are added to the rotor assembly, the second magnetic steel sheets are added to the stator assembly, each first magnetic steel sheet is placed at the middle part of an interval between the two second magnetic steel sheets, and by the above manner, the relative positions of the rotor assembly and the stator assembly are fixed, so that the response speed is increased, the vibration frequency is high, and the service life is prolonged.

10 Claims, 5 Drawing Sheets

(56) References Cited

U.S. PATENT DOCUMENTS

| | | | |
|---|---|---|---|
| 2010/0132139 A1* | 6/2010 | Jungnickel | A61C 17/3418 15/22.1 |
| 2010/0237720 A1* | 9/2010 | Taylor | H02K 11/33 310/38 |
| 2012/0110856 A1* | 5/2012 | Kressmann | H02K 16/02 30/45 |
| 2016/0218576 A1* | 7/2016 | Luo | H02K 33/16 |
| 2016/0301346 A1* | 10/2016 | Elenga | H02K 33/16 |
| 2017/0100224 A1* | 4/2017 | Wills | A61C 17/3445 |
| 2020/0237492 A1* | 7/2020 | Xie | A61C 17/34 |

* cited by examiner

| Test time | Motor | Voltage | Working frequency | Current | Noise | Load state/amplitude of oscillation of brush | Conclusion of Characteristics |
|---|---|---|---|---|---|---|---|
| 1-50H Continuous running | Embodiment 1 | 3.7 | 72 | 482 | 55db | load of 200g/4mm | ok |
| | Embodiment 2 | 3.7 | 72 | 460 | 58db | load of 200g/3mm | ok |
| | Spring motor | 3.7 | 72 | 620 | 57db | load of 200g/2.5mm | ok |
| 50-100H Continuous running | Embodiment 1 | 3.7 | 72 | 452 | 57db | load of 200g/4mm | ok |
| | Embodiment 2 | 3.7 | 72 | 450 | 60db | load of 200g/3.5mm | ok |
| | Spring motor | 3.7 | 72 | 620 | 65db | load of 200g/2mm | ok |
| 100-150H Continuous running | Embodiment 1 | 3.7 | 72 | 485 | 57db | load of 200g/4mm | ok |
| | Embodiment 2 | 3.7 | 72 | 470 | 60db | load of 200g/2.5mm | ok |
| | Spring motor | 3.7 | 72 | 635 | 80db | load of 200g/0mm | NG |
| 150-200H Continuous running | Embodiment 1 | 3.7 | 72 | 460 | 62db | load of 200g/3.5mm | ok |
| | Embodiment 2 | 3.7 | 72 | 455 | 65db | load of 200g/2.5mm | ok |
| | Spring motor | 3.7 | 72 | 650 | 88db | load of 200g/0mm | NG |

FIG. 5

ELECTRIC TOOTHBRUSH MOTOR

CROSS REFERENCE TO RELATED APPLICATION

This application claims priority to and takes the benefit of Chinese Patent Application No. 201910079451.1 filed on Jan. 28, 2019, the contents of which are herein incorporated by reference.

TECHNICAL FIELD

The present disclosure relates to the technical field of electric toothbrushes, and in particular to an electric toothbrush motor.

BACKGROUND

In recent years, the electric toothbrush can completely clean dental plaque, reduces gingivitis and gingival bleeding, and more scientifically and effectively clean the teeth in comparison with the common toothbrushes so as to be loved by people. Its key component is a motor for the electric toothbrush, and the motor is powered to drive a toothbrush head to rotate or vibrate so as to decompose the toothpaste and rub and clean the teeth.

On the market, the common electric toothbrush sonic motor drives a rotor to rotate by utilizing the magnetic interaction principle and rotates again to the normal position under the action of a reset torsion spring. Furthermore, in the prior art, a magnetic field is generated mostly by two or a plurality of magnet materials or powered electromagnets, and the reset torsion spring sleeves a rotating shaft of the rotor and then is fixed by a screw or a clamping slot. However, in a motor utilizing such structure, elastic elements are easy to be out of operation, and the swinging angle of a motor shaft is small, so, after the electric toothbrush is used for a long time, its structure of the motor is loosened so that the service life of the motor is shortened, and the operating sound of the motor is not ideally controlled so that the using effects of the electric toothbrush are influenced.

SUMMARY

In order to overcome the above technical defects, a purpose of the present disclosure is to provide an electric toothbrush motor, wherein the amplitude of oscillation of a rotating shaft is increased, the response speed is increased, the vibration frequency is improved, the structure is simple, the use is convenient, the service life is long, the noises are low, the using effects are good, and the market requirement can be met.

In order to achieve the above purpose, the present disclosure is implemented by the following technical schemes.

An electric toothbrush motor comprises a mounting shell, an end cover, conductors, a rotor assembly and a stator assembly, wherein the rotor assembly and the stator assembly are fixedly arranged in an accommodating cavity of the mounting shell through the end cover.

The rotor assembly comprises an insulator, a rotating shaft, two coils, the first rubber locating component and a plurality of first magnetic steel sheets; one end of the rotating shaft respectively penetrates through the insulator and the first rubber locating component and extends out of the end cover, and the other end of the rotating shaft penetrates through the bottom of the mounting shell; the plurality of first magnetic steel sheets are respectively clamped in the first rubber locating component; and the two coils are correspondingly arranged in limiting slots of the insulator, and one end of each conductor is connected with the corresponding coil while the other end penetrates through the first rubber locating component and is guided out of the end cover.

The stator assembly comprises two magnetic tiles, the second rubber locating component and a plurality of second magnetic steel sheets, the two magnetic tiles are respectively and correspondingly arranged on the two sides of the insulator, the plurality of second magnetic steel sheets are clamped in the inner side wall of the second rubber locating component, and the second rubber locating component sleeves the first rubber locating component.

Furthermore, the rotating shaft is provided with two bushings, and due to the two bushings, the rotor assembly and the stator assembly are located on the rotating shaft.

Furthermore, the rotating shaft is provided with two bearings, and due to the two bearings, the mounting shell is located on the rotating shaft.

Furthermore, both sides of the first rubber locating component are respectively provided with the first clamping slot, and the plurality of first magnetic steel sheets are fixed in the first clamping slots.

Furthermore, the number of the first magnetic steel sheets is two.

Furthermore, a plurality of second clamping slots are formed in the inner side wall of the second rubber locating component, and the plurality of second magnetic steel sheets are fixedly clamped in the plurality of second clamping slots.

Furthermore, the number of the second clamping slots is four, and the number of the second magnetic steel sheets is four.

Furthermore, the insulator is a transverse H-shaped insulator.

Furthermore, the insulator is an insulating rubber component or a silicon steel sheet, the surface of which is provided with an insulating coating.

Furthermore, the coating on the silicon steel sheet is a polytetrafluoroethylene coating with the thickness of 0.1 mm to 0.3 mm.

In conclusion, the present disclosure has the following advantages:

1. the first magnetic steel sheets are added to the rotor assembly, the second magnetic steel sheets are added to the stator assembly, each first magnetic steel sheet is placed at the middle part of an interval between the two second magnetic steel sheets, and by the above manner, the relative positions of the rotor assembly and the stator assembly are fixed; and such structure replaces springs and clips in the traditional toothbrush motor, so that the response speed is increased, the vibration frequency is high, and the service life is prolonged;

2. the two magnetic tiles are respectively and correspondingly arranged on the two sides of the insulator, and an integral structure is not adopted, so that the structure is simple and is convenient to assemble, detach and use; and 3. the insulator utilizes a transverse H-shaped design, and the insulator is the insulating rubber component or the silicon steel sheet, the surface of which is provided with an insulating coating, so that the amplitude of oscillation of the rotating shaft is increased, the use is convenient, the service life is prolonged, the noises are reduced, the using effects are good, and the market requirement is met.

In the drawings, 100-mounting shell; 101-end cover; 102-bearing; 200-rotor assembly; 201-insulator; 202-rotating shaft; 203-coil; 204-first rubber locating component; 2041-first clamping slot; 205-first magnetic steel sheet; 300-stator assembly; 301-magnetic tile; 302-second rubber locating component; 3021-second clamping slot; 303-second magnetic steel sheet; 400-conductor; and 500-bushing.

DESCRIPTION OF THE EMBODIMENTS

The following further describes the present disclosure in conjunction with the accompanying drawings and embodiments.

Embodiment 1

As shown in FIG. 1, FIG. 2, FIG. 3 and FIG. 4, an electric toothbrush motor comprises a mounting shell 100, an end cover 101, conductors 400, a rotor assembly 200 and a stator assembly 300, wherein the rotor assembly 200 and the stator assembly 300 are fixedly arranged in an accommodating cavity of the mounting shell 100 through the end cover 101.

The rotor assembly 200 comprises an insulator 201, a rotating shaft 202, two coils 203, the first rubber locating component 204 and a plurality of first magnetic steel sheets 205; one end of the rotating shaft 202 respectively penetrates through the insulator 201 and the first rubber locating component 204 and extends out of the end cover 101, and the other end of the rotating shaft 202 penetrates through the bottom of the mounting shell 100; the plurality of first magnetic steel sheets 205 are respectively clamped in the first rubber locating component 204; and the two coils 203 are correspondingly arranged in limiting slots of the insulator 201, and one end of each conductor 400 is connected with the corresponding coil 203 while the other end penetrates through the first rubber locating component 204 and is guided out of the end cover 101.

The stator assembly 300 comprises two magnetic tiles 301, the second rubber locating component 302 and a plurality of second magnetic steel sheets 303, the two magnetic tiles 301 are respectively and correspondingly arranged on the two sides of the insulator 201, the plurality of second magnetic steel sheets 303 are clamped in the inner side wall of the second rubber locating component 302, and the second rubber locating component 302 sleeves the first rubber locating component 204.

Wherein the rotating shaft 202 is provided with two bushings 500, and due to the two bushings 500, the rotor assembly 200 and the stator assembly 300 are located on the rotating shaft 202.

Wherein the rotating shaft 202 is provided with two bearings 102, and due to the two bearings 102, the mounting shell 100 is located on the rotating shaft 202.

Wherein both sides of the first rubber locating component 204 are respectively provided with the first clamping slot 2041, and the plurality of first magnetic steel sheets 205 are fixed in the first clamping slots 2041.

Wherein the number of the first magnetic steel sheets 205 is two.

Wherein a plurality of second clamping slots 3021 are formed in the inner side wall of the second rubber locating component 302, and the plurality of second magnetic steel sheets 303 are fixedly clamped in the plurality of second clamping slots 3021.

Wherein the number of the second clamping slots 3021 is four, and the number of the second magnetic steel sheets 303 is four.

Wherein the insulator 201 is a transverse H-shaped insulator.

Wherein the insulator 201 is an insulating rubber component.

When the electric toothbrush motor is working, the first magnetic steel sheets 205 of the rotor assembly 200 match with the second magnetic steel sheets 303 of the stator assembly 300, so that each first magnetic steel sheet 205 is suspended at the middle part of an interval between the two second magnetic steel sheets 303, one end of the rotating shaft 202 supports the interior of a bearing hole through the corresponding bearing 102 and is limited to the bushings 500, and the conductors 400 are guided out of the end cover 101. The electric toothbrush motor is powered through a circuit board which switches the positive electrode and the negative electrode of a power supply under a constant frequency, the coils 203 connected with the conductors 400 are powered to generate the electromagnetic force, and then the magnetic tiles 301 of the stator assembly 300 correspondingly arranged on the two sides of the insulator 201 generate a deflection motion so as to drive each first magnetic steel sheet 205 to break away from the middle part of the interval between the two second magnetic steel sheets 303 and to be close to the second magnetic steel sheets 303 on one side, and due to the homo-polar repulsion principle, when the rotor assembly 200 and the first magnetic steel sheets 205 simultaneously deflect to a certain angle, the repulsion force generated by the first magnetic steel sheets 205 and the second magnetic steel sheets 303 counteracts the electromagnetic force generated by the coils 203, and the rotor assembly 200 stops rotating; and when the coils 203 is inversely powered, an opposite motion is generated.

Wherein the insulator 201 is the insulating rubber component, thereby reducing the manufacturing costs of the motor, increasing the response speed, improving the vibration frequency and prolonging the service life.

Embodiment 2

As shown in FIG. 1, FIG. 2, FIG. 3 and FIG. 4, an electric toothbrush motor comprises a mounting shell 100, an end cover 101, conductors 400, a rotor assembly 200 and a stator assembly 300, wherein the rotor assembly 200 and the stator assembly 300 are fixedly arranged in an accommodating cavity of the mounting shell 100 through the end cover 101.

The rotor assembly 200 comprises an insulator 201, a rotating shaft 202, two coils 203, a first rubber locating component 204 and a plurality of first magnetic steel sheets 205; one end of the rotating shaft 202 respectively penetrates through the insulator 201 and the first rubber locating component 204 and extends out of the end cover 101, and the other end of the rotating shaft 202 penetrates through the bottom of the mounting shell 100; the plurality of first magnetic steel sheets 205 are respectively clamped in the first rubber locating component 204; and the two coils 203 are correspondingly arranged in limiting slots of the insulator 201, and one end of each conductor 400 is connected with the corresponding coil 203 while the other end penetrates through the first rubber locating component 204 and is guided out of the end cover 101.

The stator assembly 300 comprises two magnetic tiles 301, a second rubber locating component 302 and a plurality of second magnetic steel sheets 303, the two magnetic tiles 301 are respectively and correspondingly arranged on the two sides of the insulator 201, the plurality of second magnetic steel sheets 303 are clamped in the radially outer side walls of slots (3021) of the second rubber locating component 302, and the second rubber locating component 302 sleeves the first rubber locating component 204.

Wherein the rotating shaft 202 is provided with two bushings 500, and due to the two bushings 500, the rotor assembly 200 and the stator assembly 300 are located on the rotating shaft 202.

Wherein the rotating shaft 202 is provided with two bearings 102, and due to the two bearings 102, the mounting shell 100 is located on the rotating shaft 202.

Wherein both sides of the first rubber locating component 204 are respectively provided with the first clamping slot 2041, and the plurality of first magnetic steel sheets 205 are fixed in the first clamping slots 2041.

Wherein the number of the first magnetic steel sheets 205 is two.

Wherein a plurality of second clamping slots 3021 are formed in the inner side wall of the second rubber locating component 302, and the plurality of second magnetic steel sheets 303 are fixedly clamped in the plurality of second clamping slots 3021.

Wherein the number of the second clamping slots 3021 is four, and the number of the second magnetic steel sheets 303 is four.

Wherein the insulator 201 is a transverse H-shaped insulator.

Wherein the insulator 201 is a silicon steel sheet, the surface of which is provided with an insulating coating.

Wherein, the coating on the silicon steel sheet is a polytetrafluoroethylene coating with the thickness of 0.1 mm to 0.3 mm.

The working principle of embodiment 2 is the same as that of embodiment 1, except that the insulator 201 is the silicon steel sheet, the surface of which is provided with the insulating coating, and the coating on the silicon steel sheet is the polytetrafluoroethylene coating with the thickness of 0.1 mm to 0.3 mm. Due to such design of the electric toothbrush motor provided by the present disclosure, the response speed is increased, the vibration frequency is improved, the structure is simple, the use is convenient, the service life is long, the noises are low, the using effects are good, and the market requirement can be met.

In order to test the service life of the electric toothbrush motor provided by the present disclosure, in particular, related experiments are carried out by aiming at the existing spring motor and embodiment 1 and embodiment 2 of the present disclosure.

A purpose of the experiments is to test whether the related characteristics of the magnetic suspension motor developed by Tianfu Motor Co., LTD. are improved by aiming at problems that the twisting force is reduced, the amplitude of oscillation is irregular, the noises are increased or the motor is shut down after the toothbrush motor runs for a while.

A test method comprises: an analog controller is used, wherein a power supply of the controller outputs the power frequency of 50-80 times per second; after the motor, which is installed in a toothbrush head, runs for every 50 hours, a pressure load of 200 g is additionally applied to the toothbrush head in order to test the working twisting force and the noises of the motor.

Figure 1:
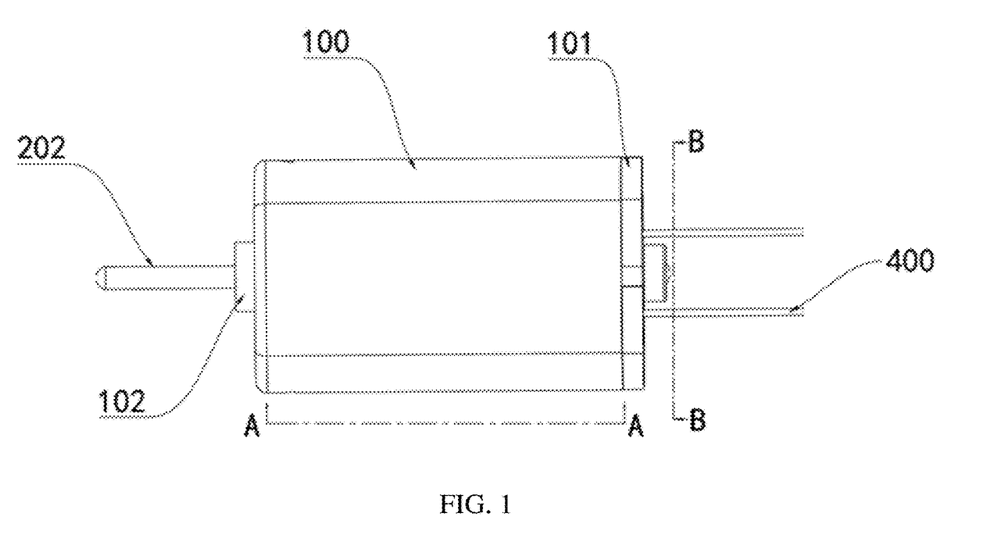
FIG. 1 is a schematic diagram of a structure of the present disclosure.
Figure 2:
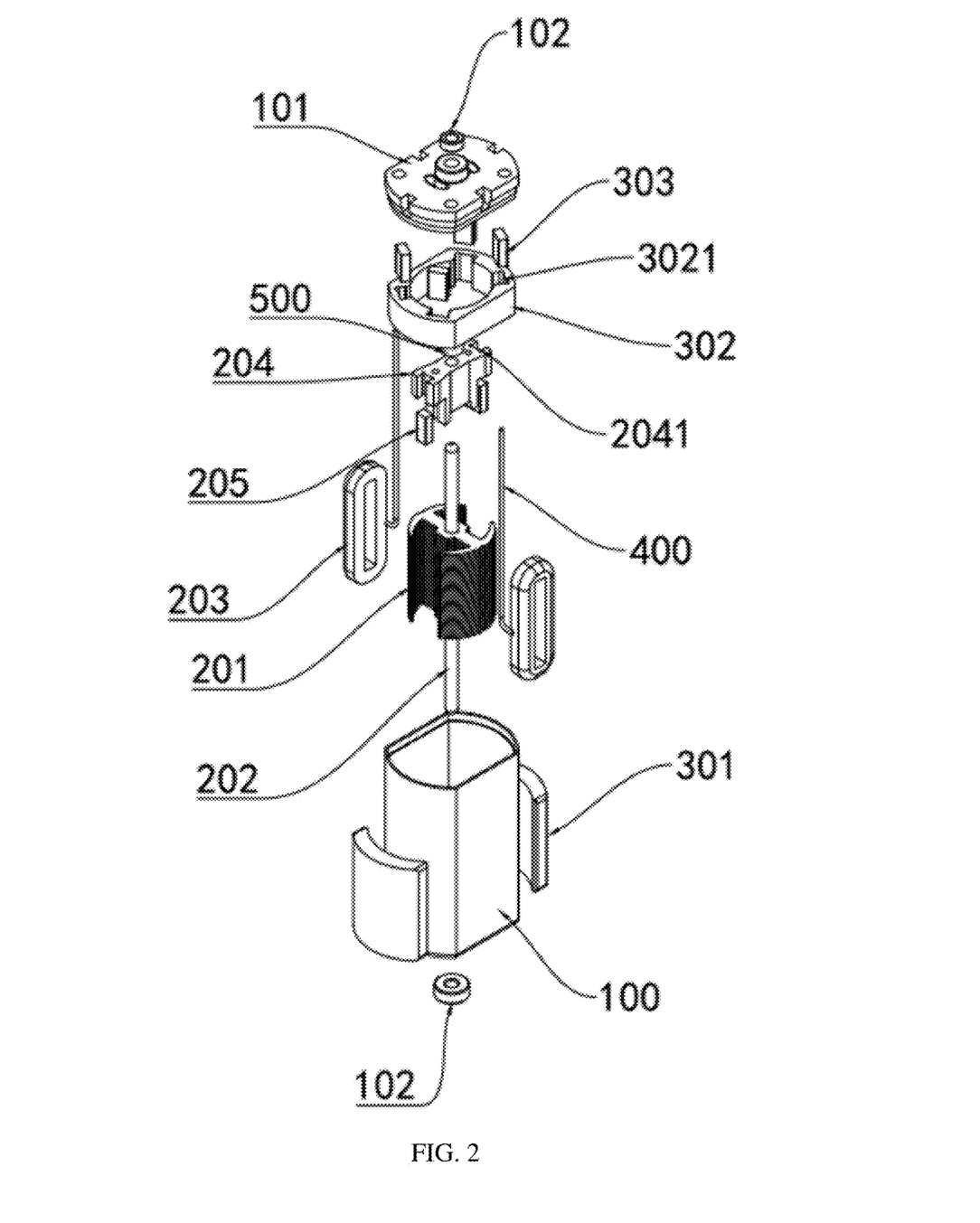
FIG. 2 is an exploded schematic diagram of a structure of the present disclosure.
Figure 3:
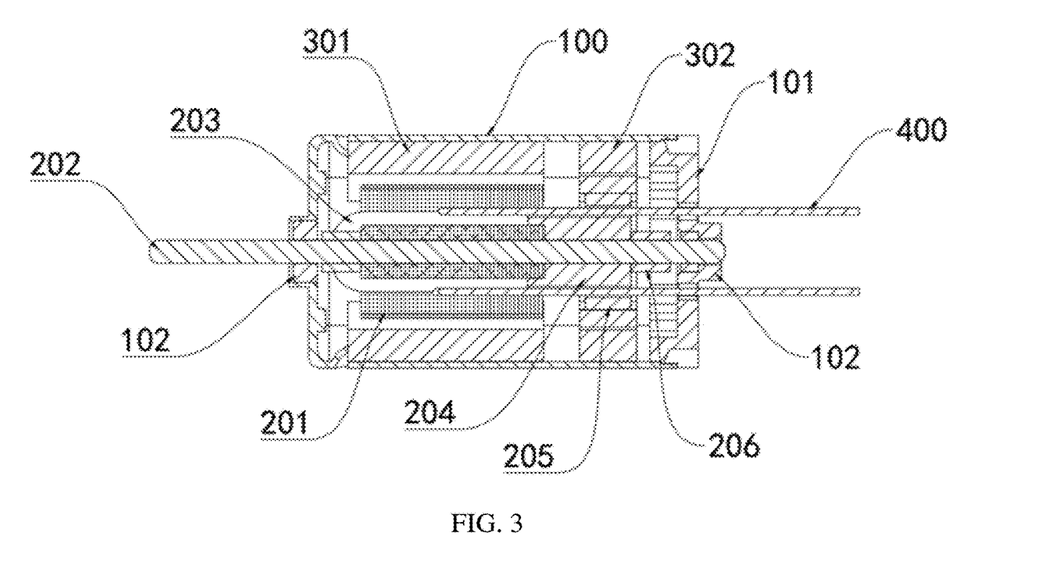
FIG. 3 is a cutaway view of FIG. 1 along the A-A line.
Figure 4:
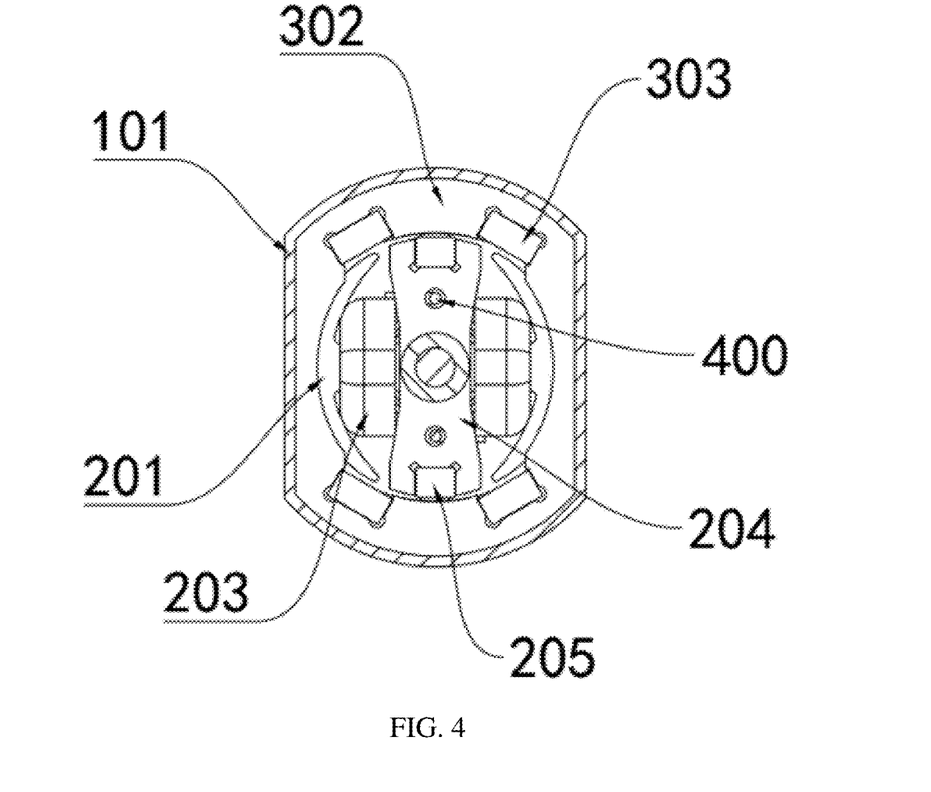
FIG. 4 is a cutaway view of FIG. 1 along the B-B line.
Figure 5:
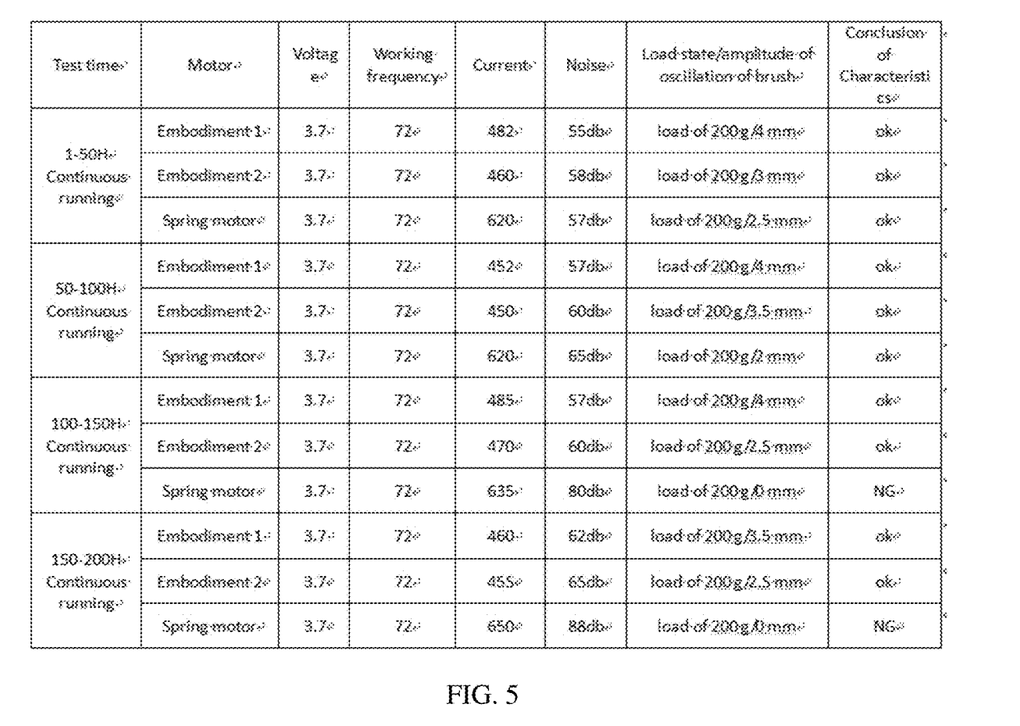
FIG. 5 is a table of performance test data of an electric toothbrush motor.

Specific test data of the experiments is as shown in FIG. 5.

In conclusion, by adopting the electric toothbrush motor provided by the present disclosure, the amplitude of oscillation of the rotating shaft is increased, the response speed is increased, the vibration frequency is improved, the structure is simple, the use is convenient, the service life is long, the noises are low, the using effects are good, and the market requirement can be met.

Those skilled in the art may further make other various corresponding changes and transformations according to the above technical schemes and conceptions, and all of these changes and transformations shall fall within the protection scope of the claims of the present disclosure.

What is claimed is:

1. An electric toothbrush motor, comprising a mounting shell (100), an end cover (101), conductors (400), a rotor assembly (200) and a stator assembly (300), wherein the rotor assembly (200) and the stator assembly (300) are fixedly arranged in an accommodating cavity of the mounting shell (100) through the end cover (101); and characterized in that:
   the rotor assembly (200) comprises an insulator (201), a rotating shaft (202), two coils (203), a first rubber locating component (204) and a plurality of first magnetic steel sheets (205); one end of the rotating shaft (202) respectively penetrates through the insulator (201) and the first rubber locating component (204) and extends out of the end cover (101), and the other end of the rotating shaft (202) penetrates through the bottom of the mounting shell (100); the plurality of first magnetic steel sheets (205) are respectively clamped in the first rubber locating component (204); and the two coils (203) are correspondingly arranged in limiting slots of the insulator (201), and one end of each conductor (400) is connected with the corresponding coil (203) while the other end penetrates through the first rubber locating component (204) and is guided out of the end cover (101); and
   the stator assembly (300) comprises two magnetic tiles (301), a second rubber locating component (302) and a plurality of second magnetic steel sheets (303), the two magnetic tiles (301) are respectively and correspondingly arranged on the two sides of the insulator (201), the plurality of second magnetic steel sheets (303) are clamped in the radially outer side walls of slots (3021) of the second rubber locating component (302), and the second rubber locating component (302) sleeves the first rubber locating component (204).

2. The electric toothbrush motor according to claim 1, characterized in that: the rotating shaft (202) is provided with two bushings (500), and due to the two bushings (500), the rotor assembly (200) and the stator assembly (300) are located on the rotating shaft (202).

3. The electric toothbrush motor according to claim 1, characterized in that: the rotating shaft (202) is provided with two bearings (102), and due to the two bearings (102), the mounting shell (100) is located on the rotating shaft (202).

4. The electric toothbrush motor according to claim 1, characterized in that: both sides of the first rubber locating component (204) are respectively provided with the first clamping slot (2041), and the plurality of first magnetic steel sheets (205) are fixed in the first clamping slots (2041).

5. The electric toothbrush motor according to claim 4, characterized in that: the number of the first magnetic steel sheets (205) is two.

6. The electric toothbrush motor according to claim 1, characterized in that: a plurality of second clamping slots (3021) are formed in the inner side wall of the second rubber locating component (302), and the plurality of second magnetic steel sheets (303) are fixedly clamped in the plurality of second clamping slots (3021).

7. The electric toothbrush motor according to claim 6, characterized in that: the number of the second clamping slots (3021) is four, and the number of the second magnetic steel sheets (303) is four.

8. The electric toothbrush motor according to claim 1, characterized in that: the insulator (201) is a transverse H-shaped insulator.

9. The electric toothbrush motor according to claim 8, characterized in that the insulator (201) is a silicon steel sheet, the surface of which is provided with an insulating coating.

10. The hair dryer according to claim 9, characterized in that the coating on the silicon steel sheet is a polytetrafluoroethylene coating with the thickness of 0.1 mm to 0.3 mm.

* * * * *